B. C. BALL & L. E. YOUNIE.
DEMOUNTABLE TIRE RIM.
APPLICATION FILED FEB. 24, 1911.
1,069,313.
Patented Aug. 5, 1913.
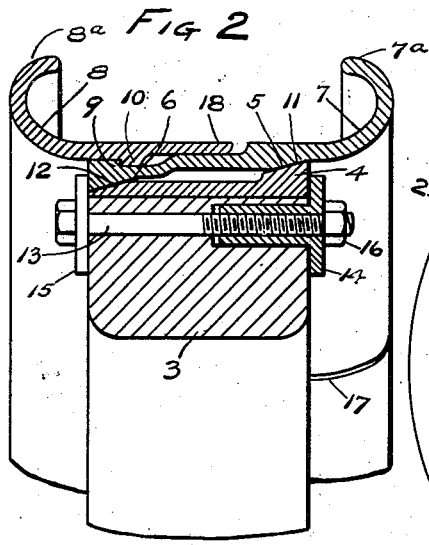
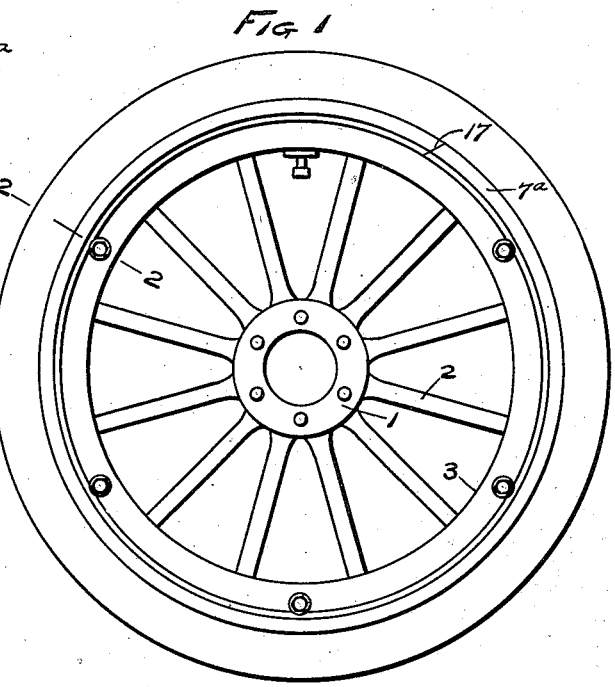
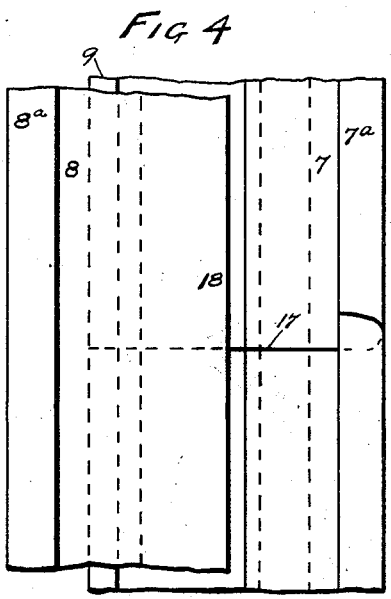
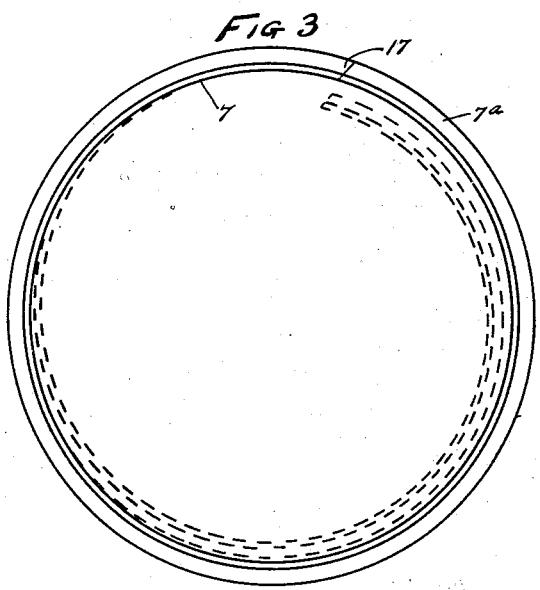
Witnesses
Blanche Hartman
Vinnie C. Hess
Inventors
Bert C. Ball
and
Lewis E. Younie
Attorney

UNITED STATES PATENT OFFICE.

BERT C. BALL AND LEWIS E. YOUNIE, OF PORTLAND, OREGON.

DEMOUNTABLE TIRE-RIM.

1,069,313.   Specification of Letters Patent.   Patented Aug. 5, 1913.

Application filed February 24, 1911. Serial No. 610,595.

*To all whom it may concern:*

Be it known that we, BERT C. BALL and LEWIS E. YOUNIE, citizens of the United States, residing at Portland, in the county of Multnomah and State of Oregon, have invented new and useful Improvements in Demountable Tire-Rims, of which the following is a specification.

This invention relates to demountable tire rims, and consists in certain improvements in the construction thereof as will be hereinafter fully described and pointed out in the claims.

The invention forms a part of the subject matter contained in application #584,161, filed September 26, 1910.

It is particularly advantageous where it is desirable to carry a tire on the rim in an inflated condition. In addition to this, the present construction is such that the tire itself may be quickly and readily detached from the rim so that in this sense, the invention relates to a separable rim.

The invention is illustrated in the accompanying drawings as follows:

Figure 1 shows a side elevation of the wheel with a tire in place thereon. Fig. 2 a section of a demountable wheel rim, and wheel felly on the line 2—2 in Fig. 1. Fig. 3 a side elevation of the rim showing the method of unlocking the rim part. Fig. 4 a plan view of a fragment of the rim.

1 marks the wheel hub, 2 the spokes and 3 the felly. These may be of any ordinary construction. The fixed rim 4 is arranged on the felly. It has the tapered surfaces 5 and 6. The tire rim is formed in two parts 7 and 8. The part 7 has the exterior annular shoulder 9, while the part 8 has the interior shoulder 10, these shoulders being arranged to interlock so as to sustain the lateral strain on the rim. The part 7 has the tapered surfaces 11 and 12 which conform to or engage the tapered surfaces 5 and 6. A bolt 13 extends through the felly. A flanged washer 14 at one end engages the thicker part of the fixed rim 4, and the washer 15 is of sufficient diameter to engage the edge of the part 7. As the bolt is set up by the nut 16, the tapered surfaces 11 and 12 are forced upon the surfaces 5 and 6 so as to make a tight fit between the fixed rim and the rim part.

The rim part 7 is separated transversely at 17, and the rim part 8 is a complete annulus. This separation is on a slight slant to the radial line, thus permitting this rim part to be swung down when the tire is demounted as clearly shown in Fig. 3. By this springing down, the shoulder 9 clears the shoulder 10 and permits the removal of the rim part 7. The rim part 8 has the lip 18 which extends inwardly from the shoulder 10 and overlaps the part 7.

It will be noted that the rim part 8 forms a complete ring and prevents the outward expansion of the rim part 7, and the rim part 7 separated transversely is securely clamped when the parts are on the fixed rim between the complete ring 8 and the fixed rim 4. This is a very important feature in that when the tire is mounted and in use, and becomes deflated, the rim part 7 which is transversely separated is securely locked in place so as to prevent its accidental detachment. Furthermore, that portion of the part 7 adjacent to the ends and projecting laterally from the supporting fixed rim forms the weakest portion of the rim and this is better secured by reason of the fact that the inner portions of these ends are securely clamped against the inner surface of the part 8 by the action of the tapered surfaces 5 and 6 of the fixed rim on the surfaces 11 and 12.

Both the rim parts have tire supporting surfaces, and they have the shoulders 7ª and 8ª formed directly on the parts. Preferably, the shoulders are of such shape that the edge of the tire itself locks the end of the rim part 7 from springing inwardly so as to disengage the shoulders 9 and 10 when the rim is demounted and the tire inflated. As shown the rims are formed for a clencher tire and the edges of the shoulders 7ª and 8ª project inwardly so that the locking edge of such a tire will extend under the shoulders and thus lock the rim parts when demounted.

The shoulders 9 and 10 are undercut. By undercutting the shoulders adjacent to the line of separation 17, the shoulders are locked in engagement by the pressure put on the rim parts as the tire is inflated. It will be readily observed that when the tire is inflated the two rim parts are subjected to great lateral strain incident to the inflation pressure and the undercutting of the shoulders makes it necessary in order to disengage the parts while inflated to move the tire shoulders 8ª and 7ª toward each other a distance equal to the undercut against this strain. Through this construction, therefore, the rim parts are securely locked together when demounted by the action of the tire itself. This interlocking of the undercut shoulders may be depended upon entirely for locking the rim parts but where the clencher flanges 7ª and 8ª are used these flanges are also locked by the tire edges as the tire is inflated. It is preferable, however, to have the undercut shoulders in that the locking is then accomplished directly at the shoulders so that there is no danger of the springing of the parts permitting the disengagement of the shoulders under inflation strain. It will also be observed that these locking devices operating in connection with the tire are manually operative with the tire deflected to release the shoulders from engagement. By reason of this, the tire may be readily removed from the rim parts when demounted without the use of tools and this is an important advantage in constructions of this type. The construction makes one of very few parts, and is one that operates very successfully. Each rim part has a tire supporting surface, as well as, a securing shoulder. The shoulders 9 and 10 may be varied in position laterally as desired. For some forms of metal it may be desirable to change the location of these shoulders laterally, from the position shown, but we prefer the location of the shoulder as arranged. This rim lends itself very readily to the detaching of the tire. All that is necessary is to force that part of the tire edge immediately adjacent to one of the ends of the rim part 7 so as to permit the springing down of the end of the rim part 7. As soon as the springing down starts it permits a slight lateral springing of the rim part and the rolling over of the edge of the tire allows of the ready separating of the rim parts without a lateral movement of the edge of the tire. This is very desirable in that the tire parts especially at the bottom often become so engaged that it is difficult to move them laterally.

In assembling the rim the tire is placed on the part 8, one end of the part slipped into place and then pressure is exerted successively to points around the part 7 until the opposite end is snapped into place. It will be noted that the surface opposite the locking surface of the shoulder 10 is sloping so that as the edge of the part 7 is forced to place in assembling the parts this sloping surface forces it inwardly so it will slip past the shoulder 10.

By arranging the locking shoulders 9 and 10 at one side of the rim the added thickness of the assembled rim at that side may be utilized in connection with the fixed rim to permit of the ready assembling of the demounted rim on the fixed rim. In carrying out this advantage, the fixed rim is formed of lesser diameter at one side than the other and the shouldered side of the assembled rim is arranged to engage the side of the fixed rim having the lesser diameter. In this way that part of the demounted rim opposite the interlocking shoulder side may be made comparatively thin and still properly engage the fixed rim and the interlocking shoulders of themselves give sufficient thickness to that side of the demountable rim to compensate for the difference in diameter of the fixed rim.

What we claim as new is:

1. In a demountable tire rim, the combination of two rim parts, the first separated transversely and having a tire retaining flange and an exterior locking shoulder thereon; the said locking shoulder being at the side of the assembled rim the more remote from the tire flange on said separated part and the second part being in the form of a ring and having a tire retaining flange and interior locking shoulder thereon, the first part extending telescopically within the second part with the locking shoulders interlocking at the side of the assembled rim the more remote from the flange on the separated rim part, the assembled rim presenting an interior supporting surface of smaller diameter at the side having the interlocking shoulders.

2. In a demountable tire rim, the combination of two rim parts, the first part separated transversely and having a tire retaining flange for receiving the tire thrust at one edge, and an exterior locking shoulder at the side of the assembled rim the more remote from the tire retaining flange on said first part; and a second part forming a complete ring and having an interior locking shoulder engaging the exterior locking shoulder on the first part and having a tire retaining flange near its edge.

3. In a demountable tire rim, the combination of two rim parts, the first part separated transversely and having a tire retaining flange for receiving the tire thrust at one edge, and an exterior locking shoulder at the side of the assembled rim the more remote from the tire retaining flange on said first part; and a second part forming a complete ring and having an interior locking shoulder engaging the exterior locking shoulder on the first part, having a tire retaining flange near its edge, and having a lip extending inwardly from the locking shoulder and overlapping the first part.

4. In a demountable tire rim, the combination of two rim parts, the first part separated transversely, and having an exterior locking shoulder thereon, a tire retaining flange thereon for directly engaging the edge of the tire and a tire supporting surface extending laterally inward from the tire retaining flange for directly engaging the inner periphery of the tire, said tire retaining flange having an inwardly projecting edge adapting it for a clencher tire; and a second rim part forming a complete ring and having an interior locking shoulder engaging the exterior locking shoulder on the first part, and a tire retaining flange for directly engaging the edge of the tire, said tire retaining flange having an inwardly projecting edge, the said rim parts being adapted to be locked in engagement by the pressure of an inflated tire, and the engaged exterior and interior locking shoulders being shallow compared with the tire shoulders to permit of the removal of the greater part of the first rim part by an inward and lateral movement on the part and a tilting movement on the tire edge.

5. In a demountable tire rim, the combination of two rim parts, the first part separated transversely and having an exterior locking shoulder thereon, and a tire retaining flange; and a second part forming a complete ring having an interior locking shoulder in the form of a rib with an engaging surface on one side of the rib for engaging the exterior locking shoulder on the first rim part, and a sloping surface opposite the engaging surface, said second rim part having a tire retaining flange thereon and a lip extending laterally from the rim part, the inner surface of the lip terminating in the sloping surface of the rib.

6. In a demountable tire rim, the combination of two rim parts, the first part in one piece separated transversely and forming with its ends in engagement a complete annulus, and having an exterior locking shoulder and a tire retaining flange thereon; and a second part forming a complete ring and having an interior locking shoulder engaging the shoulder on the first part, said shoulders being undercut adjacent to the ends of the first part, and devices on said parts operating in connection with a pneumatic tire locking the first part against a flexure disengaging said locking shoulders with the tire inflated and manually operative with the tire deflated to release the shoulders from engagement.

In testimony whereof we have hereunto set our hands in the presence of two subscribing witnesses.

BERT C. BALL.
LEWIS E. YOUNIE.

Witnesses:
ELIJAH CORBETT,
H. V. CARPENTER.